United States Patent Office 3,236,582

Patented Feb. 22, 1966

3,236,582

PROCESS OF DYEING POLYURETHANE SHAPED ARTICLE WITH WATER-SOLUBLE REACTIVE DYESTUFFS

Komao Ueda, Osamu Hara, Seiji Maekawa, Yutaka Hirasawa, and Matsuo Hashimoto, Tokyo, Japan, assignors to Nippon Kayaku Kabushiki Kaisha, Tokyo, Japan, a corporation of Japan No Drawing. Filed Apr. 27, 1962, Ser. No. 190,816
Claims priority, application Japan, Apr. 27, 1961, 36/14,713; Mar. 6, 1962, 37/8,180, 37/8,181
6 Claims. (Cl. 8—4)

This invention relates to a method for dyeing a polyurethane shaped article with water-soluble reactive dyestuffs.

Various methods for dyeing a polyurethane shaped article have been known heretofore. Generally speaking, for example, basic dyes or dispersed dyes usually are used although they show insufficient fastness. This may be due to the physical and chemical properties of polyurethane shaped article. The material is difficultly dyeable with an anionic dye containing at least one inorganic solubilizing group, or even if it has been dyed, the dyed material is of no value practically, because the deposited dye is likely to be removed by washing.

In order to overcome such disadvantages as above, an attempt has been made to obtain a dyed polyurethane shaped article possessing good fastness to water, washing and sublimation by using water soluble reactive dyestuffs. However, polyurethane shaped articles, because of the hydrophobic property thereof, show less affinity for the water-soluble reactive dye. This may be considered due to the presence of an anionic —$SO_3H$ or —COOH group in the dye molecule which makes it water soluble.

We have found that polyurethane shaped articles can be successfully dyed with a water-soluble reactive dye containing at least one inorganic solubilizing group according to the following method.

Namely, the present invention consists of the fact that polyurethane shaped articles can be well dyed with even water-soluble reactive dyestuffs by means of the addition of a cationic surfactant or an amphoteric surfactant to the dye bath, but in the case of the addition of an amphoteric surfactant the dye bath must be kept acidic.

In the dyeing method of the present invention, polyurethane shaped articles can be dyed according to the following scheme:

(1)

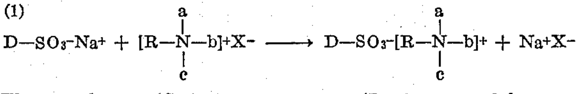

Water-soluble (reactive dye) (Cationic surfactant) (Poorly water-soluble reactive dye)

(2)

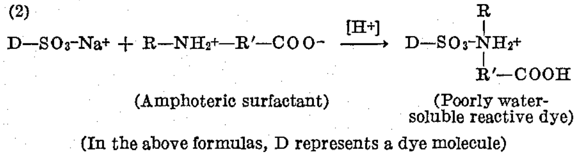

(Amphoteric surfactant) (Poorly water-soluble reactive dye)

(In the above formulas, D represents a dye molecule)

By blocking the group of the anionic water-soluble reactive dye, this dye is converted into a poorly water-soluble reactive dye which has such a high affinity for the polyurethane shaped article that it is completely exhausted by the material.

According to the dyeing method of the present invention, a polyurethane shaped article can be successfully dyed with a water-soluble reactive dyestuff resulting in a dyed material with good fastness to washing and sublimation. Perhaps the reason for the high fastness is that the reactive group of the dye molecule may combine with the material through covalent linkages. For comparison, polyurethane shaped articles are dyed in accordance with this invention with a water soluble reactive dyestuff and with a dye having a similar structure except that it has no reactive group. Each of the dyed materials are boiled with 10 g./l. of sodium carbonate solution for several hours. The material dyed with the reactive dyestuff is hardly discolored, while the other is almost entirely discolored. This may be considered due to the fact that the reactive group of the reactive dyestuff is firmly combined with the polyurethane shaped article through a covalent bond. The material which has been dyed with a dispersed dye having no reactive group is almost entirely discolored by boiling it with a solution containing 2 g./l. of sodium alkyl aryl sulfonate and 0.3 cc./l. of aqueous ammonia (s.g. 0.91), for several hours. This also supports our assumption that the reactive dyestuff is chemically bonded to the polyurethane shaped article by the practice of the invention.

Suitable as the reactive dyestuffs are the following dyestuffs, for example, dichloro-s-triazinyl dyestuffs, monochloro-s-triazinyl dyestuffs,trichloro-pyrimidine dyestuffs, and dyestuffs having the general formula

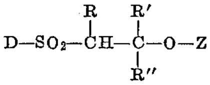

where R, R′ and R″ are hydrogen, a low alkyl-molecular radical or halogen, Z is a polybasic acid group and D is a dye molecule. Among these, those dyestuffs having the general formula

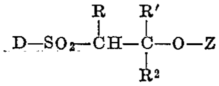

must be used in the following manner: namely, these dyestuffs are dissolved and then an alkaline material is added to the solution thereby to form reactive vinyl sulfone and thereafter neutralized with an acidic material before the said solution is used in dyeing.

A full discussion of the methods of preparing these dyes and the identification of the reactive groups of these dyes are found in an article entitled "Reactive Dyes" in Textile World, January 1961, pages 74–84.

In the dyeing method of the present invention, a cationic surfactant or an amphoteric surfactant is added to the solution of a water-soluble reactive dyestuff before the said solution is used for dyeing. In case of using an amphoteric surfactant, an acidic material must be added to a dyeing bath in order to keep the dye bath acidic. As an example of such a material there may be mentioned acetic acid, formic acid, phosphoric acid, hydrochloric acid, sulfuric acid, etc.

The following explanation will illustrate the present invention in detail: a water-soluble reactive dyestuff is taken in a suitable amount (0.01–10% based on the weight of a material to be dyed), so as to give desired shades, and then added to water. The bath ratio, based on the weight of a material to be dyed, is 1:20–200. Then, in order to block the anionic solubilizing group of the dyestuff, a cationic or amphoteric surfactant is added in the amount of 0.1–10% on the weight of the dyeing material. The amount of the cationic or amphoteric surfactant used may vary depending upon the type and the amount of a water-soluble reactive dyestuff used. Preferably, it is to be used at least in an amount sufficient to block the anionic group which makes the dye water-soluble. In case of using an amphoteric surfactant, however, the dyeing bath should be kept acidic. If a dyestuff of the general formula

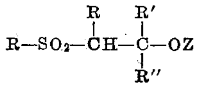

is used, as above-mentioned, an alkaline material, e.g., caustic alkali, sodium carbonate, sodium triphosphate, etc., is added to the dyeing bath to form vinyl sulfone and then the resulting dyeing solution is neutralized with an acidic material before it is used for dyeing.

Into the dyeing bath thus prepared, the polyurethane shaped article is charged at room temperature (20° to 30° C.) and dyeing is effected at 60°–100° C. for 30–60 minutes.

According to a further feature of the invention we also provide a following process for dyeing polyurethane shaped articles.

After charging a polyurethane shaped article at room temperature (20°–30° C.) into a dyeing bath containing the required amount of a dyestuff therein, the temperature of said bath is gradually raised, while a cationic or an amphoteric surfactant is added portionwise to the bath. Dyeing is effected at 60°–100° C. for 30–60 minutes.

As the results of our experiments, it is found that higher dyeing temperature is more advantageous.

We have also found that depending on the type of dyestuff used, a nonionic surfactant may be added to the dyeing bath to achieve good dispersion of a poorly water-soluble dyestuff formed by blocking the water solubilizing group of the dyestuff, whereby level dyeing may be obtained. The polyurethane shaped article thus dyed is taken from the dyeing bath, rinsed and dried. It is thereby coloured to a required shade possessing good fastness to water and sublimation.

The dyed material is subjected to soaping with a bath containing 1–5 g./l. of sodium alkyl aryl sulfonate and 0.3 cc./l. of aqueous ammonia (s.g. 0.91) at the bath ratio of 1:20–100 at 70°–100° C. for 5–15 minutes, and then rinsed and dried, resulting in a dyed polyurethane shaped article with good fastness to washing, and sublimation.

Suitable as the cationic surfactants are, for example, quaternary ammonium salts, alkyl pyridinium halides, alkyl amides, etc. Suitable as the amphoteric surfactants are those which have electrically cationic property in an acidic solution, e.g., those of betaine type. Suitable as the nonionic surfactants are those which are electrically neutral in an acidic solution, e.g., polyoxyethylene fatty acid esters, polyoxyethylene alkyl ethers, polyoxyethylene alkyl phenol ethers, etc.

As an example of the polyurethane shaped articles there may be mentioned polyurethane foams and polyurethane fibres.

The present invention is illustrated but not limited by the following examples in which the parts are by weight. In the examples the fastness tests for washing and water are carried out in accordance with ISO Recommendation Method R105 (May 1959), while the tests for sublimation are conformed to Japanese Industrial Standards for Fastness Test of dyed materials.

*Example 1*

To 100 parts of water, a reactive dyestuff described in Table 1 is dissolved. To the resulting dyeing bath, a cationic surfactant described in Table 1 is added. After stirring this mixture well, one part of polyurethane foam is charged at a room temperature. The bath temperature is gradually raised, and 15 minutes later, it reaches the predetermined temperature at which dyeing is effected for the predetermined period. After dyeing, the dyed material is removed from the bath and rinsed. It is then subjected to soaping with an aqueous solution of 0.2 part of an anionic surfactant (sodium alkyl aryl sulfonate) and 0.03 part of aqueous ammonia (s.g. 0.91) in 100 parts of water at 95° C. for 15 minutes, and thereafter it is rinsed and dried. By this process it is coloured to a bright shade possessing very high fastness to washing and sublimation. Dyeing method employed and the results thereof are set forth in Table 1.

TABLE 1

| Dyestuffs, Colour Index Nos., Amounts | Cationic surfactant, Chemical form, Amounts | Dyeing | | Shade | Fastness to Washing and Sublimation | |
|---|---|---|---|---|---|---|
| | | Temperature (° C.) | Time (Mins.) | | Change in Colour | Staining |
| Cibacron Brilliant Orange G, C.I. Reactive Orange 2, 0.01 part. | Cetyl dimethyl benzyl ammonium bromide 0.02 part. | 95 | 40 | Brilliant Orange. | 5 | 5 |
| Reactone Violet BL, C.I. Reactive Violet 2, 0.04 part. | Stearyl amine, 0.20 part | 95 | 60 | Brilliant Violet. | 5 | 5 |

In the above Table 1 Cibacron Brilliant Orange G has the following formula:

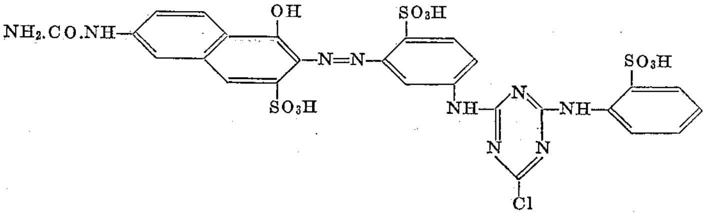

Similarly, Reactone Violet BL has the following formula:

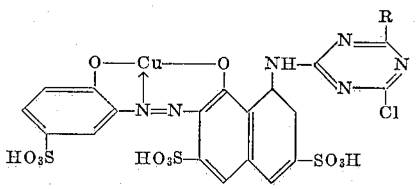

In the above, R may be $OC_6H_5$ or $NH_2$.

The above formulas are found in Collection of Czechloslovak Chemical Communications, volume 25, No. 10, October 1960. The formula for Cibacron Brilliant Orange G is Formula XX on page 2794 of the above reference and the formula for Reactone Violet BL is either Formula XXV or Formula XXVI found on page 2796 of the reference.

*Example 2*

To 100 parts of water, a reactive dyestuff described in Table 2 as well as an amphoteric surfactant described in Table 2 is dissolved. To the solution, 0.03 part of acetic acid is further added. Into the dyeing bath thus prepared, one part of polyurethane foam is charged at room temperature. The bath temperature is gradually raised, and 15 minutes later, it reaches the predetermined temperature, at which dyeing is effected for the predetermined period. After dyeing, soaping is made in the same manner as in Example 1. By this process it is coloured to a bright shade possessing very high fastness to washing and sublimation. Dyeing method and the results thereby obtained are set forth in Table 2.

TABLE 2

| Dyestuffs, Colour Index Nos., Amounts | Amphoteric surfactant, Chemical form, Amounts | Dyeing | | Shade | Fastness to Washing and Sublimation | |
|---|---|---|---|---|---|---|
| | | Temperature (° C.) | Time (Mins.) | | Change in Colour | Staining |
| Cibacron Brilliant Red 3B, C.I. Reactive Red 4, 0.02 part. | Amphitol 24B, (Kao Sekken, Japan), Alkyl betaine, 0.05 part. | 95 | 60 | Brilliant Red. | 5 | 5 |

In the above Table 2 Cibacron Brilliant Red 3B has the following formula:

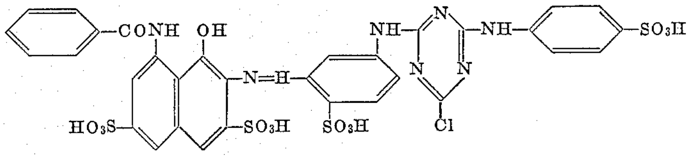

This formula is also found in the Collection of Czechloslovak Chemical Communications reference as Formula XXIII on page 2795 thereof.

What we claim is:

1. The process for the colouring of polyurethane shaped article with a dyeing bath containing a water soluble reactive dyestuff and a cationic surfactant.

2. The process for the colouring of polyurethane shaped article, as claimed in claim 1, wherein the cationic surfactant is added portionwise to the bath while dyeing is effected.

3. The process for the colouring of polyurethane shaped article, as claimed in claim 1, wherein a nonionic surfactant is added to the dyeing bath.

4. The process for the colouring of polyurethane shaped article with a dyeing bath containing as anionic water-soluble reactive dyestuff, an amphoteric surfactant and an acid substance.

5. The process for the colouring of polyurethane shaped article, as claimed in claim 4, wherein the amphoteric surfactant is added portionwise to the bath, while dyeing is effected.

6. The process for the colouring of polyurethane shaped article, as claimed in claim 4, wherein the nonionic surfactant is added to the dyeing bath.

References Cited by the Examiner

UNITED STATES PATENTS 3,025,127 3/1962 Iannarone.
3,039,840 6/1962 Sawaya.
3,043,648 7/1962 Hemmi et al.
3,112,304 11/1963 Senn.

NORMAN G. TORCHIN, *Primary Examiner.*

ABRAHAM H. WINKELSTEIN, *Examiner.*